United States Patent
Stamper (10) Patent No.: US 10,017,198 B1
(45) Date of Patent: Jul. 10, 2018

(54) TRASH BAG CADDY

(71) Applicant: Theodis Stamper, Brooklyn Center, MN (US)

(72) Inventor: Theodis Stamper, Brooklyn Center, MN (US)

(*) Notice: Subject to any disclaimer, the term of this patent is extended or adjusted under 35 U.S.C. 154(b) by 0 days.

(21) Appl. No.: 15/614,826

(22) Filed: Jun. 6, 2017

(51) Int. Cl.
| | |
|---|---|
| *B65B 67/04* | (2006.01) |
| *B62B 1/20* | (2006.01) |
| *B62B 1/10* | (2006.01) |
| *B62B 1/00* | (2006.01) |
| *B62B 1/26* | (2006.01) |

(52) U.S. Cl.
CPC .............. *B62B 1/20* (2013.01); *B62B 1/008* (2013.01); *B62B 1/10* (2013.01); *B62B 1/266* (2013.01); *B62B 1/00* (2013.01); *B62B 2202/22* (2013.01)

(58) Field of Classification Search
CPC ........... B62B 1/20; B62B 1/008; B62B 1/266; B62B 2202/22; B65B 67/1205
USPC ................................ 248/95, 97, 99, 101, 129
See application file for complete search history.

(56) References Cited

U.S. PATENT DOCUMENTS

| | | | | | |
|---|---|---|---|---|---|
| 4,357,728 | A | * | 11/1982 | Pravettone | A47L 13/52 141/108 |
| 4,413,800 | A | | 11/1983 | Kelson | |
| 4,749,158 | A | * | 6/1988 | Buckley | B62B 1/12 248/129 |
| 5,031,277 | A | * | 7/1991 | Coker | A47L 9/14 141/108 |
| D351,700 | S | * | 10/1994 | Uzelman | D34/24 |
| 6,082,574 | A | * | 7/2000 | Johnson | B65F 1/02 220/23.91 |
| 6,131,861 | A | * | 10/2000 | Fortier, Jr. | B62B 1/266 248/100 |
| 2009/0032653 | A1 | * | 2/2009 | Gilligan | B62B 1/14 248/98 |

\* cited by examiner

*Primary Examiner* — Todd M Epps
(74) *Attorney, Agent, or Firm* — Kyle A. Fletcher, Esq.

(57) ABSTRACT

The trash bag caddy is a structure that supports a trash bag in an open position. The trash bag caddy is a collapsible structure. The trash bag caddy comprises a base plate, a joist, a lesser stanchion, a greater stanchion, a ring and an optional chute. The base plate is the inferior structure of the trash bag caddy that transfers the load of the structure to the supporting surface. The inferior stanchion and the greater stanchion attach to the base plate. The joist supports the greater stanchion in a vertical position. The ring: 1) attaches the greater stanchion to the lesser stanchion; 2) supports the lesser stanchion in a vertical position; and, 3) physically supports the trash bag. The optional chute acts like a funnel that guides trash and refuse in to the trash bag. The trash bag is held in position using a plurality of clips.

20 Claims, 4 Drawing Sheets

TRASH BAG CADDY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting including conveying and handling of filamentary materials, more specifically, a support rack for holding refuse handling receptacles.

SUMMARY OF INVENTION

The trash bag caddy is a rack that is configured for use with a trash bag. The trash bag caddy is a structure that supports a trash bag in an open position such that the bag may be loaded without handling. The trash bag caddy is a collapsible structure that folds into a flat shape for storage. The trash bag caddy comprises a base plate, a joist, a lesser stanchion, a greater stanchion, a ring and an optional chute. The base plate is the inferior structure of the trash bag caddy that transfers the load of the structure to the supporting surface. The inferior stanchion and the greater stanchion attach to the base plate. The joist supports the greater stanchion in a vertical position. The ring: 1) attaches the greater stanchion to the lesser stanchion; 2) supports the lesser stanchion in a vertical position; and, 3) physically supports the trash bag. The optional chute acts like a funnel that guides trash and refuse in to the trash bag. The trash bag is held in position using a plurality of clips.

These together with additional objects, features and advantages of the trash bag caddy will be readily apparent to those of ordinary skill in the art upon reading the following detailed description of the presently preferred, but nonetheless illustrative, embodiments when taken in conjunction with the accompanying drawings.

In this respect, before explaining the current embodiments of the trash bag caddy in detail, it is to be understood that the trash bag caddy is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the trash bag caddy.

It is therefore important that the claims be regarded as including such equivalent construction insofar as they do not depart from the spirit and scope of the trash bag caddy. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 4.

The trash bag caddy 100 (hereinafter invention) is a rack that is configured for use with a trash bag 181. The invention 100 is a structure that supports a trash bag 181 in an open position such that the bag may be loaded without handling. The invention 100 is a collapsible structure that folds into a flat shape for storage. The invention 100 comprises a base plate 101, a joist 102, a lesser stanchion 103, a greater stanchion 104, a ring 105 and an optional chute 106. The base plate 101 is the inferior structure of the invention 100 that transfers the load of the structure to a supporting surface 182. The inferior stanchion and the greater stanchion 104 attach to the base plate 101. The joist 102 supports the greater stanchion 104 in a vertical position. The ring 105: 1) attaches the greater stanchion 104 to the lesser stanchion 103; 2) supports the lesser stanchion 103 in a vertical position; and, 3) physically supports the trash bag 181. The optional chute 106 acts like a funnel that guides trash and refuse in to the trash bag 181. The trash bag 181 is held in position using a plurality of clips 153.

Figure 1:
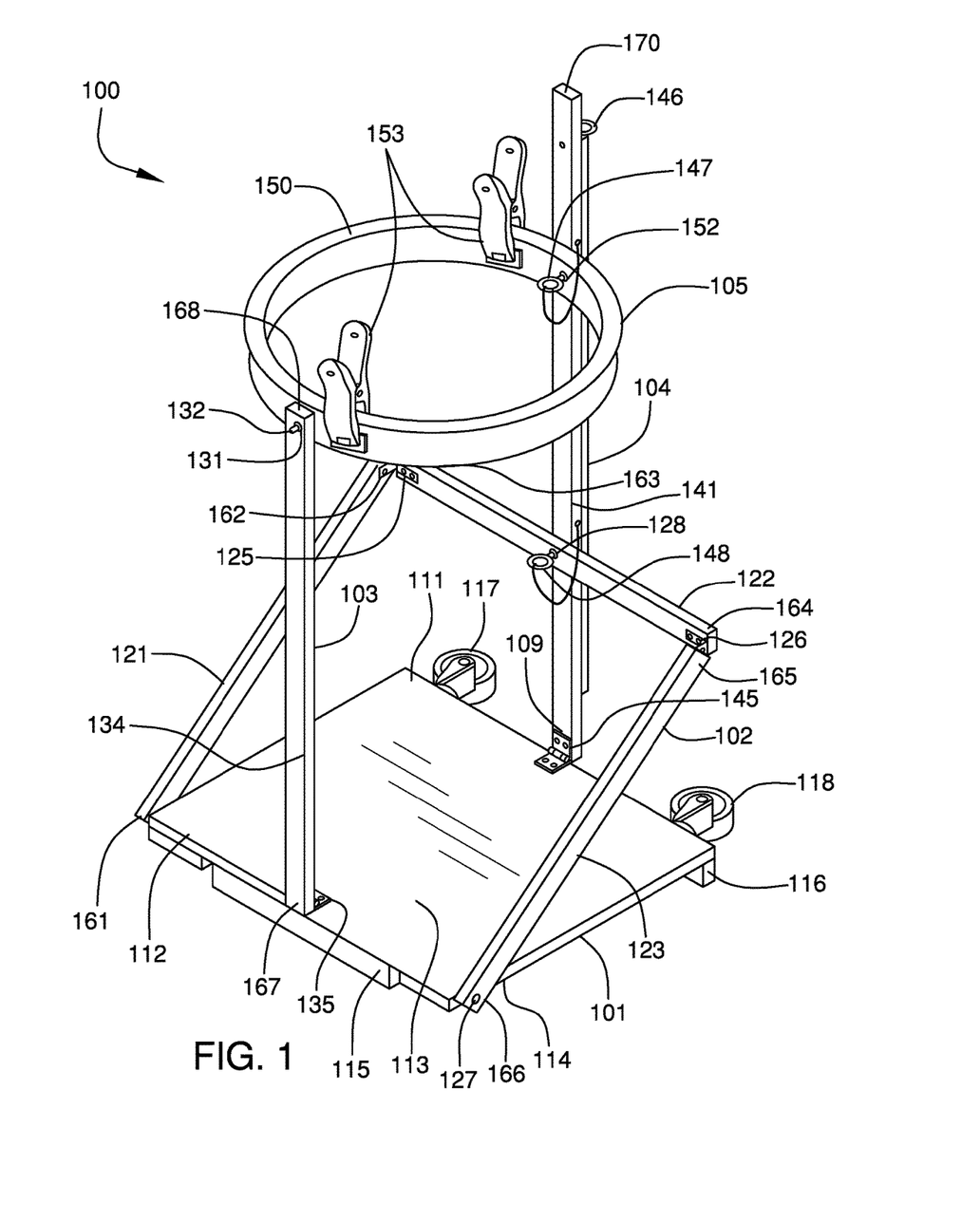
FIG. 1 is an open perspective view of an embodiment of the disclosure.
Figure 2:
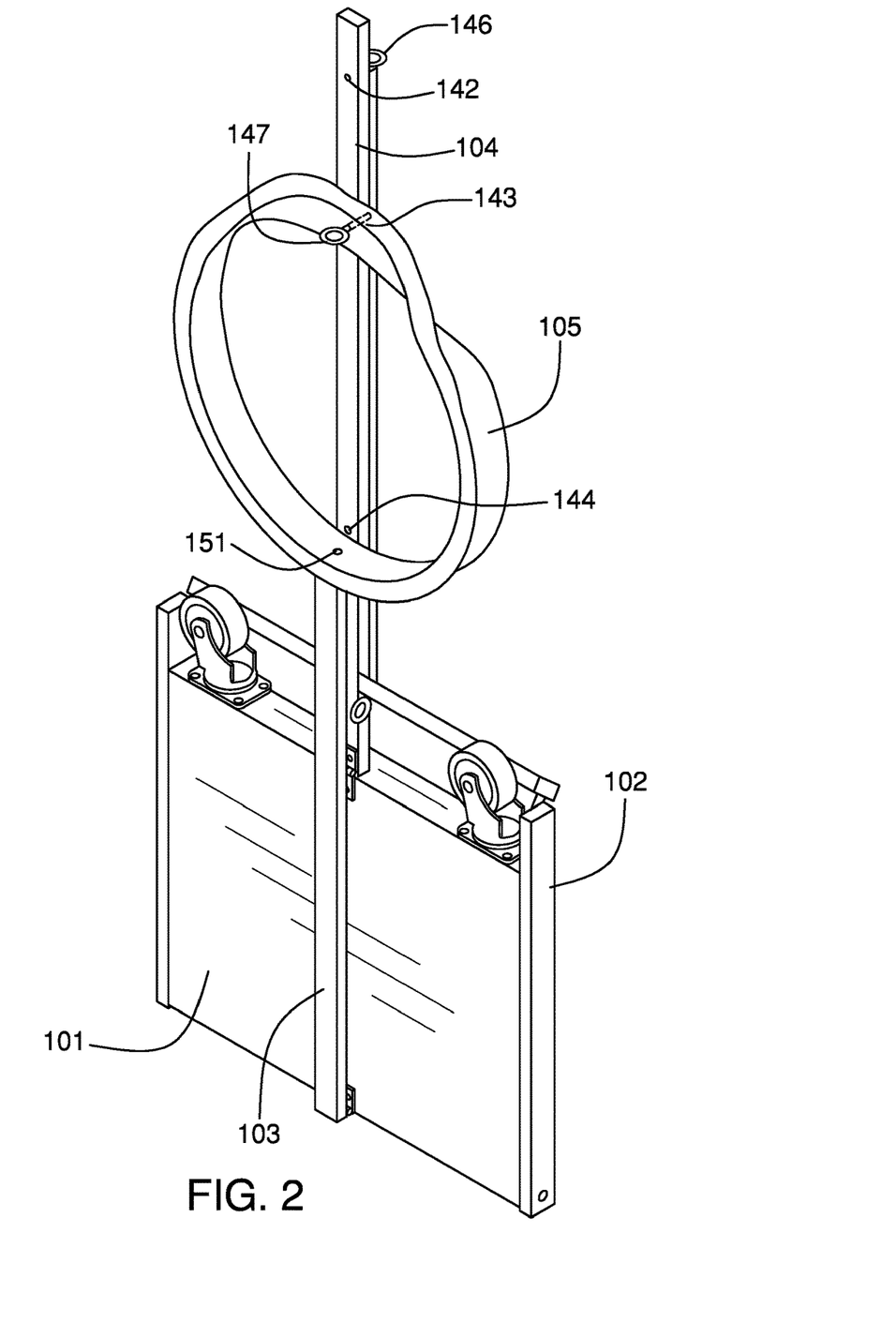
FIG. 2 is a collapsed perspective view of an embodiment of the disclosure.

The base plate 101 forms the inferior foundation of the invention 100. The base plate 101 is placed on the supporting surface 182. The base plate 101 creates a horizontal surface upon which the balance of the invention 100 is vertically erected. The base plate 101 forms a rectangular block structure commonly referred to as a plate. The base plate 101 is further defined with a greater edge 111, a lesser edge 112, a superior surface 113, and an inferior surface 114.

The base plate 101 further comprises a first footing 115, a second footing 116, a first caster 117, and a second caster 118. The first footing 115 is a supporting structure that: 1) is attached to the inferior surface 114 of the base plate 101; and, 2) that raises the inferior surface 114 above the supporting surface 182. The second footing 116 is a supporting structure that: 1) is attached to the inferior surface 114 of the base plate 101; and, 2) that raises the inferior surface 114 above the supporting surface 182. The first caster 117 is a readily and commercially available caster that is used to roll the invention 100. The second caster 118 is a readily and commercially available caster that is used to roll the invention 100.

The greater edge 111 is the edge of the base plate 101 to which the first caster 117 and the second caster 118 are attached. The lesser edge 112 is the edge of the base plate 101 that is distal from the greater edge 111. The superior surface 113 is the surface of the base plate 101 that is distal from the supporting surface 182. The inferior surface 114 is the surface of the base plate 101 that is proximal to the supporting surface 182.

The joist 102 is a support structure that is used to vertically support the greater stanchion 104. The joist 102 comprises a first strut 121, a second strut 122, a third strut 123, a first pivot 124, a second pivot 125, a third pivot 126, and a fourth pivot 127. The second strut 122 is further defined with a fifth radial hole 128 and a center axis. The first strut 121 is further defined with a first end 161 and a second end 162. The second strut 122 is further defined with a third end 163 and a fourth end 164. The third strut 123 is further defined with a fifth end 165 and a sixth end 166.

The first strut 121 is rectangular prism structure commonly called a shaft. The first strut 121 is further defined with a center axis. The second strut 122 is rectangular prism structure commonly called a shaft. The second strut 122 is further defined with a center axis. The third strut 123 is rectangular prism structure commonly called a shaft. The third strut 123 is further defined with a center axis.

The first pivot 124 is a readily and commercially available hinge. The second pivot 125 is a readily and commercially available hinge. The third pivot 126 is a readily and commercially available hinge. The fourth pivot 127 is a readily and commercially available hinge.

The fifth radial hole 128 is a radial hole that is formed through the center point of the second strut 122.

The lesser stanchion 103 is a support structure that is used to vertically support the ring 105. The lesser stanchion 103 comprises a first radial hole 131, a first cotter pin 132, a fourth strut 134, and a fifth pivot 135. The fourth strut 134 is further defined with a seventh end 167 and an eighth end 168.

The first radial hole 131 is a radial hole that is formed through the center axis of the fourth strut 134. The span of the vertical distance of the first radial hole 131 is the span of the distance from the supporting surface 182 to the center axis of the first radial hole 131 when the invention 100 is deployed for use. The first cotter pin 132 is a readily and commercially available cotter pin. The fourth strut 134 is rectangular prism structure commonly called a shaft. The fourth strut 134 is further defined with a center axis. The fifth pivot 135 is a readily and commercially available hinge.

The greater stanchion 104 is a support structure that is used to vertically support the ring 105. The greater stanchion 104 comprises a fifth strut 141, a second radial hole 142, a third radial hole 143, a fourth radial hole 144, a sixth pivot 145, a second cotter pin 146, a third cotter pin 147, and a fourth cotter pin 148. The fifth strut 141 is further defined with a ninth end 169 and a tenth end 170.

The fifth strut 141 is rectangular prism structure commonly called a shaft. The fifth strut 141 is further defined with a center axis.

The second radial hole 142 is a radial hole that is formed through the center axis of the fifth strut 141. The second radial hole 142 is proximal to the tenth end 170 of the fifth strut 141. The third radial hole 143 is a radial hole that is formed through the center axis of the fifth strut 141. The third radial hole 143 is positioned between the second radial hole 142 and the fourth radial hole 144. The fourth radial hole 144 is a radial hole that is formed through the center axis of the fifth strut 141. The fourth radial hole 144 is distal from the tenth end 170 of the fifth strut 141. The second radial hole 142, the third radial hole 143, and the fourth radial hole 144 are formed in the same face of the fifth strut 141.

The span of the vertical distance of the third radial hole 143 is the span of the distance from the supporting surface 182 to the center axis of the third radial hole 143 when the invention 100 is deployed for use. The span of the vertical distance of the first radial hole 131 and the span of the vertical distance of the third radial hole 143 are identical.

The second cotter pin 146 is a readily and commercially available cotter pin. The third cotter pin 147 is a readily and commercially available cotter pin. The fourth cotter pin 148 is a readily and commercially available cotter pin.

The sixth pivot 145 is a readily and commercially available hinge.

The ring 105 is a semi-rigid loop structure 150 that is supported above the supporting surface 182 by the lesser stanchion 103 and the greater stanchion 104. The semi-rigid loop structure 150 refers to the physical loop of the ring 105 to which the trash bag 181 is attached to during normal use of the invention 100. The semi-rigid nature of the ring 105 is such that the ring 105 presents as rigid surface that supports the trash bag 181 when the ring 105 is attached to both the lesser stanchion 103 and the greater stanchion 104 while having the flexibility to fold into a flat position when the invention 100 is collapsed for storage. The ring 105 comprises a semi-rigid loop structure 150, a first ring hole 151, a second ring hole 152, and a plurality of clips 153. In the first potential embodiment of the disclosure, the plurality of clips 153 comprises a first clip 154 and a second clip 155.

The first ring hole 151 is an aperture that is formed in the semi-rigid loop structure 150. The center of the first ring hole 151 aligns with the first radial hole 131. The second ring hole 152 is an aperture that is formed in the semi-rigid loop structure 150. The center of the second ring hole 152 aligns with the third radial hole 143. The plurality of clips 153 are clamps that are used to attach the trash bag 181 to the semi-rigid loop structure 150. The first clip 154 is a readily and commercially available clamp. The second clip 155 is a readily and commercially available clamp. The fifth cotter pin 156 is a readily and commercially available cotter pin.

In the first potential embodiment of the disclosure, the ring 105 is formed from a rubber with a modulus and flexibility comparable to a fan belt of an automobile.

In a second potential embodiment of the disclosure, the ring 105 is formed from a commercially available bi-stable spring.

Figure 4:
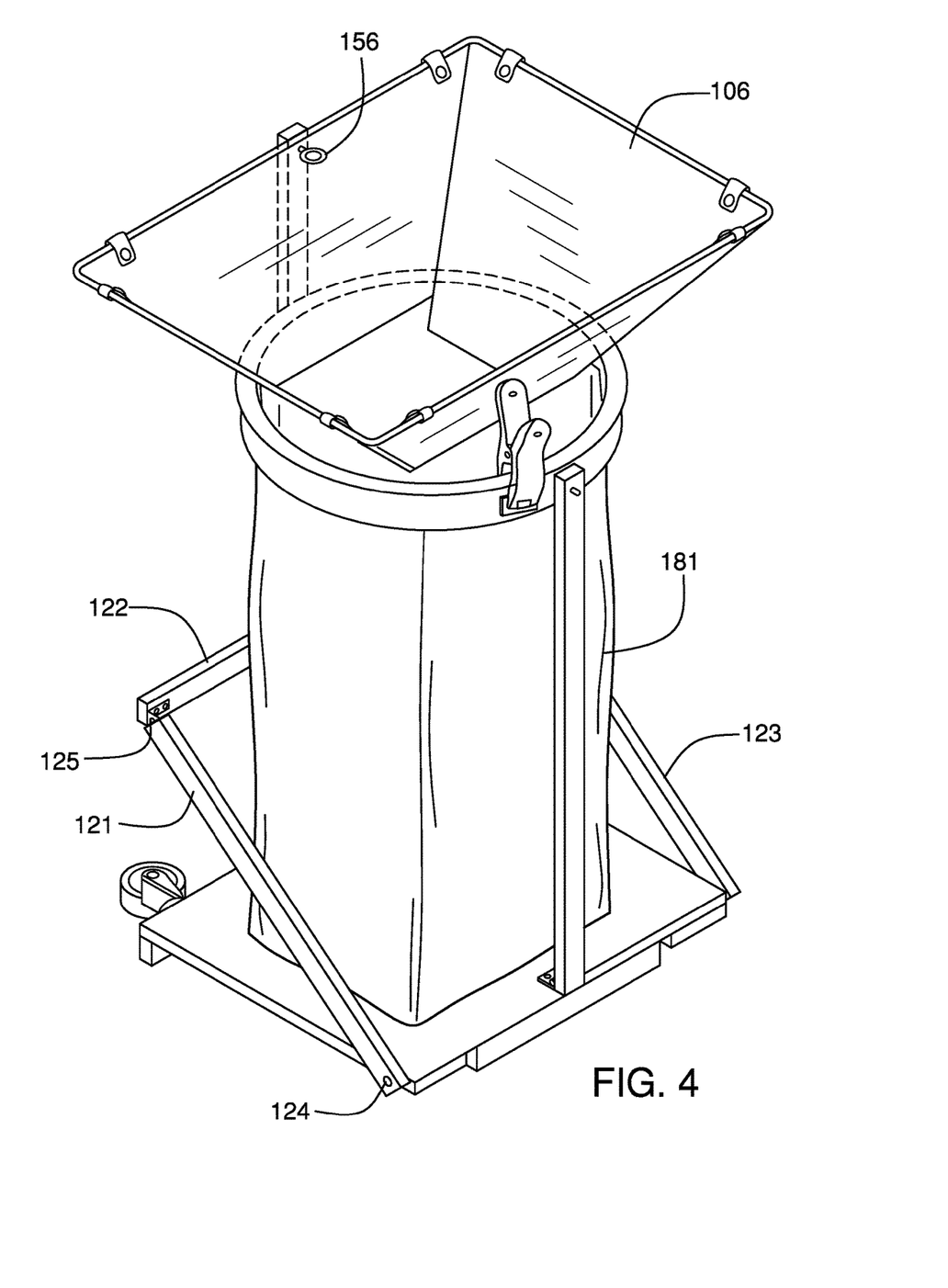
FIG. 4 is an in use view of an embodiment of the disclosure.

In a third potential embodiment of the disclosure, the invention 100 further comprises a chute 106. The chute 106 is a hollow structure that is formed in the shape of the frustum of a pyramid with a square base. The frustum planes form the base and truncate the apex of the pyramid. The apex of the pyramid is aligned at a right angle with the center of the base. Both frustum planes of the chute 106 form open faces through which trash and refuse may pass. The chute 106 is used in the manner of a funnel which guides the trash and refuse into the trash bag 181.

The invention 100 is assembled as described in the following 4 paragraphs.

The first footing 115 attaches to the inferior surface 114 of the base plate 101 along the lesser edge 112. The second footing 116 attaches to the inferior surface 114 of the base plate 101 along the greater edge 111. The first caster 117 attaches to the second footing 116 of the base plate 101. The second caster 118 attaches to the second footing 116 of the base plate 101.

The first pivot 124 attaches the first end 161 of the first strut 121 to the base plate 101. The first pivot 124 attaches the first strut 121 to the base plate 101 such that the first strut 121 rotates in a plane perpendicular to the superior surface 113. The second pivot 125 attaches the second end 162 of the first strut 121 to the third end 163 of the second strut 122. The second pivot 125 attaches the first strut 121 to the second strut 122 such that the second strut 122 will rotate with an axis of rotation that is roughly aligned with the center axis of the second strut 122. By roughly aligned is meant that that axis of rotation is aligned in a parallel fashion with the center axis of the second strut 122 and as closely aligned with the center axis of the second strut 122 as the second pivot 125 will allow.

The third pivot 126 attaches the fourth end 164 of the second strut 122 to the fifth end 165 of the third strut 123. The third pivot 126 attaches the third strut 123 to the second strut 122 such that the second strut 122 will rotate with an axis of rotation that is roughly aligned with the center axis of the second strut 122. By roughly aligned is meant that that axis of rotation is aligned in a parallel fashion with the center axis of the second strut 122 and as closely aligned with the center axis of the second strut 122 as the third pivot 126 will allow. The fourth pivot 127 attaches the sixth end 166 of the third strut 123 to the base plate 101. The fourth pivot 127 attaches the third strut 123 to the base plate 101 such that the third strut 123 rotates in a plane perpendicular to the superior surface 113.

The fifth pivot 135 attaches the seventh end 167 of the fourth strut 134 to the superior surface 113 of the base plate 101. The fifth pivot 135 attaches the fourth strut 134 to the base plate 101 such that the fourth strut 134 rotates towards and away from the superior surface 113. The sixth pivot 145 attaches the ninth end 169 of the fifth strut 141 to the superior surface 113 of the base plate 101. The sixth pivot 145 attaches the fifth strut 141 to the base plate 101 such that the fifth strut 141 rotates towards and away from the superior surface 113.

The invention 100 is assembled for use as described in the following 3 paragraphs.

The second strut 122 is raised and rotates such that: 1) the second strut 122 lays flush against the fifth strut 141; and, 2) the center axis of the fifth radial hole 128 is aligned with the center axis of the fourth radial hole 144. The fourth cotter pin 148 is simultaneously inserted through the fifth radial hole 128 and the fourth radial hole 144 to attach the joist 102 to the greater stanchion 104.

Figure 3:
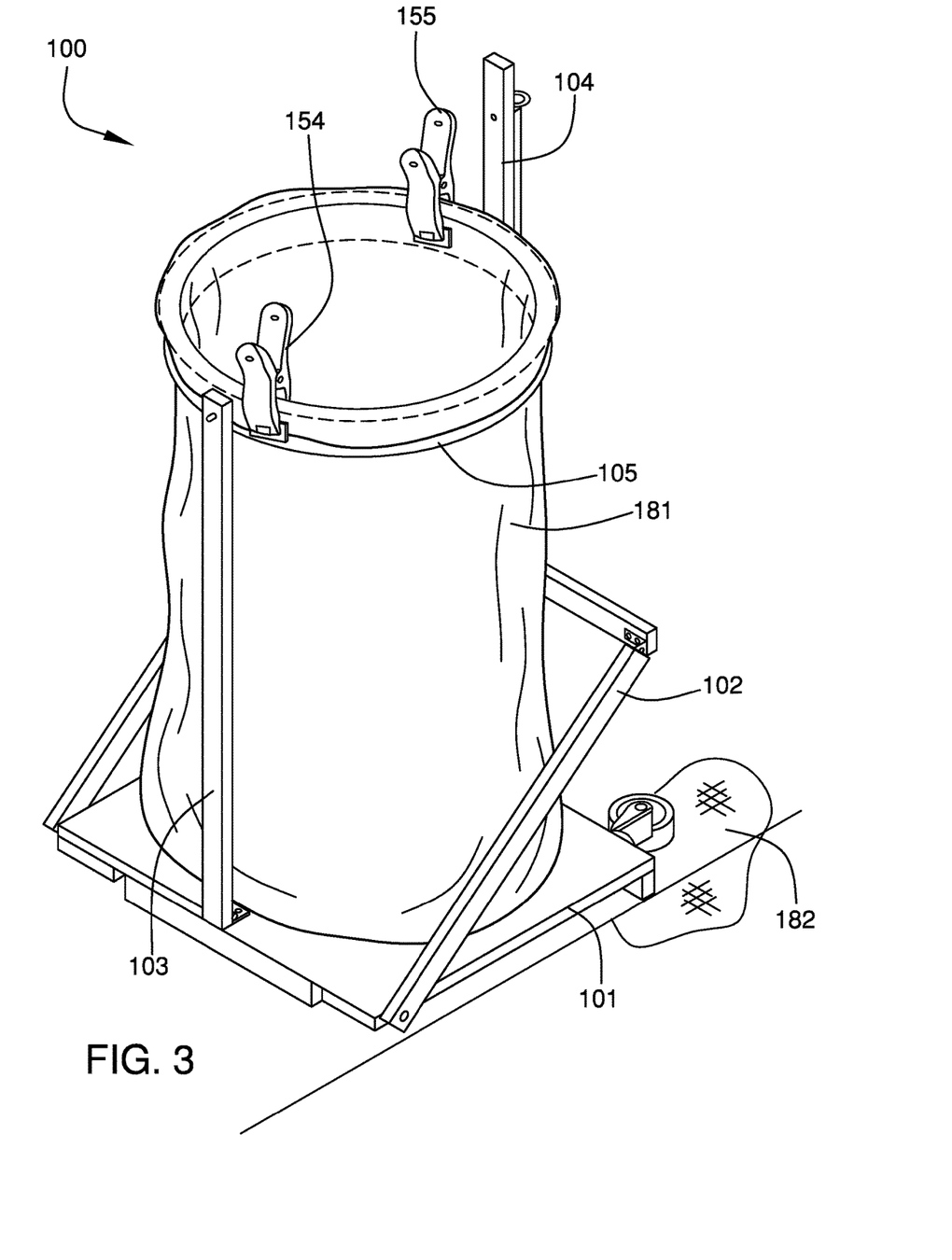
FIG. 3 is an in use view of an embodiment of the disclosure.

The center axis of the first ring hole 151 of the ring 105 is aligned with the center axis of the first radial hole 131 of the lesser stanchion 103. The first cotter pin 132 is simultaneously inserted through the first ring hole 151 and the first radial hole 131 to attach the lesser stanchion 103 to the ring 105. The center axis of the second ring hole 152 of the ring 105 is aligned with the center axis of the fourth radial hole 144 of the greater stanchion 104. The fourth cotter pin 148 is simultaneously inserted through the second ring hole 152 and the fourth radial hole 144 to attach the ring 105 to the greater stanchion 104. In this position the trash bag 181 is attached to the ring 105 using the plurality of clips 153. In the first potential embodiment of the disclosure, this involves the first clip 154 and the second clip 155.

In the second potential embodiment of the disclosure, as shown most clearly in FIG. 4, the chute 106 attaches to the second radial hole 142 using a fifth cotter pin 156. Methods to fasten structures using cotter pins is well known and documented in the mechanical arts.

To use the first caster 117 and the second caster 118, the greater stanchion 104 is pulled in the manner of a lever to rotate the base plate 101 onto the first caster 117 and the second caster 118. To provide greater leverage, in the first potential embodiment of the disclosure, the span of the vertical length of the greater stanchion 104 is greater than the span of the vertical length of the lesser stanchion 103.

The following definitions were used in this disclosure:

Align: As used in this disclosure, align refers to an arrangement of objects that are: 1) arranged in a straight line; or, 2) arranged to give a directional sense of a plurality of parallel lines.

Bag: As used in this disclosure, a bag is a container made of a flexible material. The bag has a single opening which allows the bag to receive the items to be contained.

Bi-Stable Spring: As used in this disclosure, a bi-stable spring is a type of mainspring wherein the bi-stable spring has a second stable state that exists when the bi-stable spring is fully extended (or unwound). Bi-stable springs are commercially available and are commonly referred to as slap bands or slap bracelets. The most common bi-stable springs will coil along the length direction and will have an arch across the width direction. Commercially available bi-stable springs are often coated in a silicone based coating.

Caster: As used in this disclosure, a caster is a wheel that is mounted on a swivel that allows the wheel to adjust, or swivel, the direction of rotation of the wheel to the direction of motion desired for the wheel.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Center of Rotation: As used in this disclosure, the center of rotation is the point of a rotating plane that does not move with the rotation of the plane. A line within a rotating three dimensional object that does not move with the rotation of the object is also referred to as an axis of rotation.

Clip: As used in this disclosure, a clip is a fastener that attaches to an object by gripping or clasping the object.

Cotter Pin: As used in this disclosure, a cotter pin is a metal shaft that is used to hold two mechanical components together.

Disposable: As used in this disclosure, disposable is an adjective that refers to an object that is designed and intended for a single use. Within this context, an object would be considered disposable if it is not reusable after its initial use.

Flush: As used in this disclosure, the term flush is used to describe the alignment of a first surface and a second surface on a single plane.

Frustum: As used in this disclosure, a frustum is a portion of a solid that lies between two parallel planes that intersect with the solid.

Funnel: As used in this disclosure, a funnel is a frustum of a hollow pyramid shaped object with openings at the apex and base of the pyramid. The funnel is used to guide material into a container.

Hinge: As used in this disclosure, a hinge is a device that permits the turning, rotating, or pivoting of a first object relative to a second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Load Path: As used in this disclosure, a load path refers to a chain of one or more structures that transfers a load generated by a raised structure or object to a foundation or the earth.

Loop: As used in this disclosure, a loop is the length of a first linear structure including, but not limited to, shafts, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Mainspring: As used in this disclosure, a mainspring is a spiral torsion spring made of a metal ribbon. Energy is stored in a mainspring by twisting the spiral tighter. Mainsprings are commonly found in watches. Mainsprings are also commonly referred to as coiled ribbon springs or coiled flat springs.

Pivot: As used in this disclosure, a pivot is a rod or shaft around which an object rotates or swings.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal.

Prism: As used in this disclosure, a prism is a 3 dimensional geometric structure wherein: 1) the form factor of two faces of the prism correspond to each other; and, 2) the two corresponding faces are parallel to each other. In this disclosure, when further description is required a prism will be named for the geometric or descriptive name of the form factor of the two corresponding faces. If the form factor of the two corresponding faces has no clearly established or well-known geometric or descriptive name, the term irregular prism will be used. The center axis of a prism is defined as a line that joins the center point of the first corresponding face of the prism to the center point of the second corresponding face of the prism. The center axis of a prism is otherwise analogous the center axis of a cylinder.

Pyramid: As used in this disclosure, a pyramid is a three dimensional shape that comprises a base formed in the shape of an N-gon (wherein N is an integer) with N triangular faces that rise from the base to meet at a point above the base. If the point where the N faces meet is positioned such that a line drawn from the point where the N faces meet to the center of the N-gon base is perpendicular to the N-gon base, the pyramid is referred to as a right pyramid. Pyramids can be further formed with circular or elliptical bases which are commonly referred to as cone or an elliptical pyramid respectively.

Radial hole: As used in this disclosure, a radial hole comprises a hole that is formed through a solid cylinder such that: 1) the formed hole is cylindrical; 2) the center axis of the formed hole is perpendicular to the center axis of the solid cylinder; and, 3) the center axis of the formed hole intersects the center axis of the solid cylinder. When the term radial hole is applied to a pipe, or other hollow cylindrical object, the term applies to two holes that are formed in the surface of the pipe in a manner that is consistent with the solid cylinder definition. When the term radial hole is applied to a prism formed from an N-gon when N is an even number, the assumption should be made that the center axis is formed by a line that connects the center of the first corresponding face of the prism to the center of the second corresponding face of the prism.

Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

Spring: As used in this disclosure, a spring is a device that is used to store mechanical energy. This mechanical energy will often be stored by: 1) deforming an elastomeric material that is used to make the device; 2) the application of a torque to a rigid structure; or 3) a combination of the previous two items.

Stanchion: As used in this disclosure, a stanchion refers to a vertical pole, post, or support.

Superior: As used in this disclosure, the term superior refers to a directional reference that is parallel to and in the opposite direction of the force of gravity.

Supporting Surface: As used in this disclosure, a supporting surface is a horizontal surface upon which an object is placed. Within this disclosure, it is assumed that the object is placed on the supporting surface in an orientation that is appropriate for the normal or anticipated use of the object.

Trash Bag: As used in this disclosure, a trash bag is a disposable bag formed from a sheeting that is used to contain trash and other refuse for in a manner suitable for disposal.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification.

Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A support rack comprising:
wherein the support rack comprises a base plate, a joist, a lesser stanchion, a greater stanchion, and a ring;
wherein the base plate, the joist, the lesser stanchion, and the greater stanchion are attached to the base plate;
wherein the ring attaches to the lesser stanchion and the greater stanchion;
wherein the support rack is configured for use with a trash bag;
wherein the support rack is a structure that supports the trash bag in an open position;
wherein the support rack is a collapsible structure;
wherein the base plate is an inferior structure of the support rack that transfers a load of the structure to a supporting surface;
wherein the base plate is placed on the supporting surface.

2. The support rack according to claim 1
wherein the base plate creates a horizontal surface upon which a balance of the support rack is vertically erected;
wherein the base plate is a plate;
wherein the base plate is further defined with a greater edge, a lesser edge, a superior surface, and an inferior surface.

3. The support rack according to claim 2
wherein the joist is a support structure;
wherein the joist vertically supports the greater stanchion.

4. The support rack according to claim 3
wherein the greater stanchion is a support structure;
wherein the lesser stanchion is a support structure;
wherein the greater stanchion vertically supports the ring;
wherein the lesser stanchion supports the ring above the supporting surface;
wherein the ring vertically supports the lesser stanchion.

5. The support rack according to claim 4
wherein the base plate further comprises a first footing, a second footing, a first caster, and a second caster;
wherein the first footing is a supporting structure;
wherein the first footing is attached to the inferior surface of the base plate;
wherein the second footing is a supporting structure;
wherein the second footing is attached to the inferior surface of the base plate;
wherein the first caster is attached to the second footing;
wherein the second caster is attached to the second footing.

6. The support rack according to claim 5
wherein the joist comprises a first strut, a second strut, a third strut, a first pivot, a second pivot, a third pivot, and a fourth pivot;
wherein the first strut, the second strut, and the third strut are interconnected using the second pivot and the third pivot;
wherein the joist is attached to the base plate using the first pivot and the third pivot.

7. The support rack according to claim 6
wherein the first strut is a first rectangular prism structure;
wherein the first strut is further defined with a first end and a second end;
wherein the second strut is a second rectangular prism;
wherein the second strut is further defined with a third end, a fourth end and a sixth center axis;
wherein the third strut is a third rectangular prism structure;
wherein the third strut is further defined with a fifth end and a sixth end;
wherein the first pivot is a hinge;
wherein the second pivot is a hinge;
wherein the third pivot is a hinge;
wherein the fourth pivot is a hinge.

8. The support rack according to claim 7
wherein the second strut further comprises a fifth radial hole;
wherein the fifth radial hole is a radial hole that is formed through a center point of the second strut;
wherein the fifth radial hole is further defined with a fifth center axis.

9. The support rack according to claim 8
wherein the lesser stanchion comprises a first radial hole, a first cotter pin, a fourth strut, and a fifth pivot;
wherein the fourth strut is a rectangular prism structure;
wherein the fourth strut is further defined with a seventh end, an eighth end, and a seventh center axis;
wherein the first radial hole is a radial hole;
wherein the first radial hole is further defined with a first center axis;
wherein the first radial hole is formed through the fourth strut;
wherein the first cotter pin is a shaft;
wherein the fifth pivot is a hinge.

10. The support rack according to claim 9
wherein the greater stanchion comprises a fifth strut, a second radial hole, a third radial hole, a fourth radial hole, a sixth pivot, a second cotter pin, a third cotter pin, and a fourth cotter pin;
wherein the fifth strut is a rectangular prism structure;
wherein the fifth strut is further defined with a ninth end and a tenth end;
wherein the fifth strut is further defined with an eighth center axis;
wherein the second radial hole is a radial hole;
wherein the second radial hole is further defined with a second center axis;
wherein the second radial hole is formed through the fifth strut;
wherein the third radial hole is a radial hole;
wherein the third radial hole is further defined with a third center axis;
wherein the third radial hole is formed through the fifth strut;
wherein the fourth radial hole is a radial hole;
wherein the fourth radial hole is further defined with a fourth center axis;

wherein the fourth radial hole is formed through the fifth strut;
wherein the second cotter pin is a shaft;
wherein the third cotter pin is a shaft;
wherein the fourth cotter pin is a shaft;
wherein the sixth pivot is a hinge.

11. The support rack according to claim 10
wherein the second radial hole is proximal to the tenth end of the fifth strut;
wherein the third radial hole is a radial hole that is a formed through the eighth center axis of the fifth strut;
wherein the third radial hole is positioned between the second radial hole and the fourth radial hole;
wherein the fourth radial hole is distal from the tenth end of the fifth strut;
wherein the second radial hole, the third radial hole, and the fourth radial hole are formed in a same face of the fifth strut.

12. The support rack according to claim 11
wherein a span of the vertical distance of the first radial hole is a span of the distance from the supporting surface to the first center axis of the first radial hole;
wherein a span of the vertical distance of the third radial hole is a span of the distance from the supporting surface to the third center axis of the third radial hole;
wherein the span of the vertical distance of the first radial hole and the span of the vertical distance of the third radial hole are identical.

13. The support rack according to claim 12
wherein the ring comprises a semi-rigid loop structure, a first ring hole, a second ring hole, and a plurality of clips;
wherein the first ring hole is an aperture that is formed in the semi-rigid loop structure;
wherein the second ring hole is an aperture that is formed in the semi-rigid loop structure;
wherein the plurality of clips are clamps that are used to attach the trash bag to the semi-rigid loop structure;
wherein a fifth cotter pin is a shaft.

14. The support rack according to claim 13
wherein the first footing attaches to the inferior surface of the base plate along the lesser edge;
wherein the second footing attaches to the inferior surface of the base plate along the greater edge;
wherein the first caster attaches to the second footing of the base plate;
wherein the second caster attaches to the second footing of the base plate;
wherein the first pivot attaches the first end of the first strut to the base plate;
wherein the first pivot attaches the first strut to the base plate such that the first strut rotates in a plane perpendicular to the superior surface;
wherein the second pivot attaches the second end of the first strut to the third end of the second strut;
wherein the second pivot attaches the first strut to the second strut such that the second strut will rotate;
wherein the third pivot attaches the fourth end of the second strut to the fifth end of the third strut;
wherein the third pivot attaches the third strut to the second strut such that the second strut will rotate with an axis of rotation that is roughly aligned with the center axis of the second strut;
wherein the fourth pivot attaches the sixth end of the third strut to the base plate;
wherein the fourth pivot attaches the third strut to the base plate such that the third strut rotates in a plane perpendicular to the superior surface;
wherein the fifth pivot attaches the seventh end of the fourth strut to the superior surface of the base plate;
wherein the fifth pivot attaches the fourth strut to the base plate such that the fourth strut rotates;
wherein the sixth pivot attaches the ninth end of the fifth strut to the superior surface of the base plate;
wherein the sixth pivot attaches the fifth strut to the base plate such that the fifth strut rotates.

15. The support rack according to claim 14
wherein the second strut lays flush against the fifth strut;
wherein the fifth center axis of the fifth radial hole is aligned with the fourth center axis of the fourth radial hole;
wherein the fourth cotter pin is simultaneously inserted through the fifth radial hole and the fourth radial hole;
wherein the center of the first ring hole aligns with the first center axis of the first radial hole;
wherein the first cotter pin is simultaneously inserted through the first ring hole and the first radial hole;
wherein the center of the second ring hole aligns with the third center axis of the third radial hole;
wherein the fourth cotter pin is simultaneously inserted through the second ring hole and the fourth radial hole;
wherein the trash bag is attached to the ring using the plurality of clips.

16. The support rack according to claim 15 wherein the support rack further comprises a chute;
wherein the chute is a hollow structure that is formed in the shape of a frustum of a pyramid with a square base;
wherein frustum planes form a base and truncate an apex of the pyramid;
wherein the apex of the pyramid is aligned at a right angle with a center of the base;
wherein both frustum planes of the chute form open faces;
wherein the chute attaches to the second radial hole using a fifth cotter pin.

17. The support rack according to claim 16 wherein the ring is a rubber structure.

18. The support rack according to claim 17 wherein
the plurality of clips comprises a first clip and a second clip;
wherein a span of the vertical length of the greater stanchion is greater than a span of the vertical length of the lesser stanchion.

19. The support rack according to claim 16 wherein the ring is a bi-stable spring.

20. The support rack according to claim 19 wherein
the plurality of clips comprises a first clip and a second clip;
wherein a span of the vertical length of the greater stanchion is greater than a span of the vertical length of the lesser stanchion.

* * * * *